April 14, 1959     E. H. GREIBACH     2,882,497
ELECTRICAL CURRENT MEASURING DEVICES
Filed Feb. 25, 1954
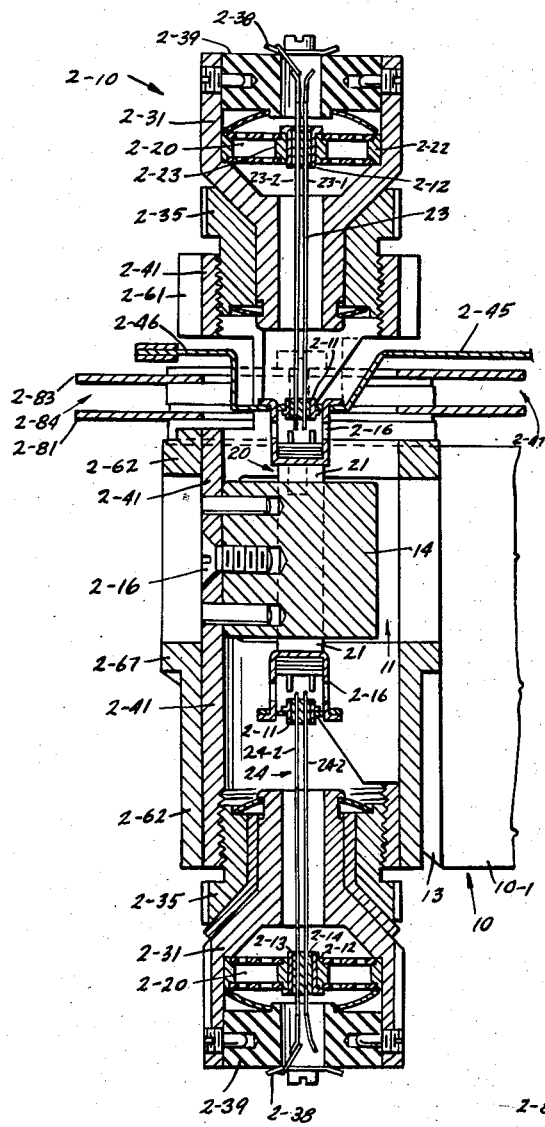
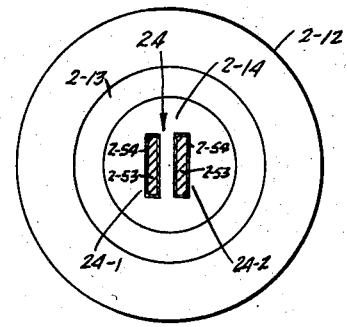
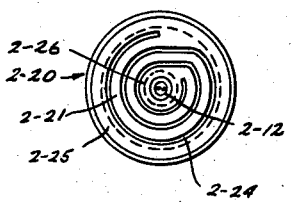
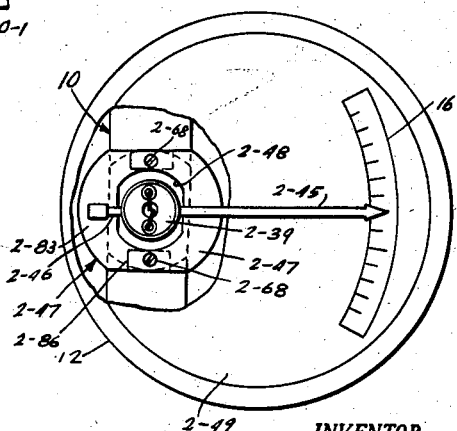
INVENTOR.
E. H. GREIBACH
BY
*Greene, Pineles & Durr*
ATTORNEYS

United States Patent Office 2,882,497
Patented Apr. 14, 1959

2,882,497

ELECTRICAL CURRENT MEASURING DEVICES

Emil H. Greibach, New Rochelle, N.Y.

Application February 25, 1954, Serial No. 412,462

6 Claims. (Cl. 324—154)

This invention relates to electric current measuring devices and more particularly, to electrical measuring devices having a rotatable coil of the type used in a direct-current meter movement of the D'Arsonval type in which the coil is carried by a bifilary suspension structure in the field zone of a magnetic field structure for giving an accurate indication of the current flowing through the meter coil.

In the past, it has been considered essential to utilize a platinum alloy for the filaments of the tensioned bifilary suspension members of practical direct-current meters. However, such drawn platinum alloy filaments have an extremely smooth surface, and the anchoring junction insulating cementitious material by which the platinum filaments are joined to each other have presented critical problems.

Among the objects of the invention are bifilary suspension members for the meter coil of such measuring devices which overcome the difficulties heretofore encountered when forming them out of platinum alloy filaments.

The invention is based on the discovery that by forming the bifilary suspension members out of filaments of drawn ductile tungsten of minute cross-sectional area which tungsten filament is electroplated with a platinum coating of minute thickness, it is possible to provide bifilary meter coil suspension members exhibiting a strength and stability of a much higher order of magnitude than obtainable in the past with filaments of platinum alloys or other metal of high tensile strength.

Another object of the invention is a bifilary coil suspension structure having bifilary members which provide a material increase of the obtainable sensitivity by forming the filary elements of each suspension member of flat metal filaments instead of filaments of circular or in general, square cross-section.

The foregoing and other objects of the invention will be best understood from the following description of exemplifications thereof, reference being had to the accompanying drawings wherein:

Fig. 1 is a partially cross-sectional view of the movement portion of a meter movement exemplifying the invention together with a diagrammatic view showing how it is used as a part of an electrothermic alternating current meter;

Fig. 2 is a greatly enlarged top view of the spring unit or spring structure of Fig. 1;

Fig. 3 is a cross-sectional top view through the bifilary suspension member of Fig. 1; and Fig. 4 is a top view with parts broken away of one form of a meter operating with a movement of Fig. 1.

The present invention is directed to the bifilary coil suspension members of current meters of the type disclosed in U.S. Patent 2,562,183, wherein the movable meter coil is deflectively held suspended in its operative position within the air gap or field zone of the magnetic field structure by tensioned bifilary suspension members. Such prior-art filary coil suspension members are formed of two adjacent metal filaments only about 0.0025 to 0.001 inch in cross-sectional width and even less, each of the opposite pairs of two filament ends of a suspension member being insulatingly joined to each other at a spacing of about 0.003 to 0.015 inch within a surrounding anchoring metal sleeve by an insulating cement which fills the anchoring sleeve. Because of the extremely small cross-section and the relatively large tension forces to which they are subjected, it is essential that the filaments of such bifilary suspension members remain unaffected by corrosive action of elements such as oxygen, and that the metal of the filaments should not become recrystallized. It is also essential that the insulating anchoring junction formed between the two filament ends at each end of each such bifilary junction member should be of sufficiently great strength so as to withstand the tension forces and shocks to which they are subjected in use.

In the past, it has been considered essential to utilize platinum, alloyed with palladium, ruthenium and rhodium, for the filaments of the tensioned bifilary suspension members of practical direct-curent meters of the foregoing type. However, such drawn platinum filaments have an extremely smooth surface and the anchoring junction by which such platinum filaments are joined into bifilary suspension members of the coil suspension system have presented critical problems.

One phase of the invention is the discovery that the critical difficulties encountered with the use of platinum filaments for the bifilary suspension members of a current meter of the foregoing type are avoided by forming their bifilary suspension members out of filaments of drawn ductile tungsten which have been electroplated with a thin coating of platinum. I have discovered that drawn ductile tungsten filaments of a cross-sectional thickness of about 0.001 inch or less which had been electroplated with a thin coating of platinum have an exterior surface with pronounced minute irregularities consisting of peaks and valleys, which irregularities are of a much higher order of magnitude than surface irregularities found in other metal filaments of substantial tensile strength. As a result, bifilary suspension members formed out of so plated tungsten filaments have at their end junctions—where they are joined by insulating cement—a junction strength of a much higher order of magnitude than obtainable with platinum alloys or other metal filaments of required great tensile strength.

Current meters having the coil deflectively suspended by bifilary suspension members formed of platinum plated tungsten filament have also the great advantage that the bifilary suspension members may be subjected to much greater tension than in prior-art instruments and that such current meters exhibit a much greater degree of ruggedness and are capable of withstanding a higher order of vibratory disturbances without damage to the critical coil suspension.

Good results are obtained with bifilary suspension members formed of drawn ductile tungsten having, in case of a circular cross-section filament, a diameter of 0.00085 to 0.0008 inch, with a platinum surface coating produced by electro-deposition, the weight of the platinum coating being about 1% or, in general, about ½ to 2% of the tungsten of the filament. Instead of platinum, the coating may be formed by electro-deposition of other metals of the platinum group, such as palladium, ruthenium, rhodium, iridium, osmium, which provide a corrosion-resistant exterior for the extremely thin tungsten filament of the suspension member and which do not diffuse or melt into the solder when soldering a wire lead connection to the end of a metal filament of such bifilary coil suspension members.

The platinum plating is also of great value in making it possible to solder the tungsten filament end portions to a terminal lug or copper wire, as bare tungsten will not be wetted by tin and, therefore, cannot be provided with a solder connection made with common electric solder.

Figs. 1–4 show by way of example, partially in structural and partially in diagrammatic form, an electrothermic alternating current meter which has as a part thereof a D'Arsonval direct-current meter movement in connection with which exemplifications of the invention will be described.

The direct-current meter movement of Figs. 1 to 4, generally designated 2–10, comprises a moving coil 20 and a cooperating relatively fixed magnetic field structure consisting of core structure 10. The magnetic core structure 10 has a permanent magnet structure 10–1 with poles pieces extending toward an intermediate core element 14 and arranged to produce a strong unidirectional magnetic field within a limited field zone consisting of opposite circular air gaps 11 separating the pole pieces from core element 14. The opposite operative coil sides 21 of the meter coil are positioned in the field zone of the opposite circular magnetic air gaps for imparting to the meter coil 20 a deflection corresponding to the direct current therethrough.

The meter coil 20 is carried in its operative position by two bifilary suspension members 23, 24 connected with their inner ends to the opposite transverse outer sides of the meter coil 20. Each of the two bifilary suspension members 23, 24 is formed of two closely spaced wire-like metal filaments 24–1, 24–2, as shown in detail in Fig. 3. The opposite ends of each pair of suspension filaments are insulatingly joined to each other into opposite end anchor elements 2–11, 2–12.

Each end anchor element 2–11, 2–12 (Fig. 3) of each bifilary suspension member 23, 24 is shown formed of a cylindrical metal sleeve 2–13 filled with a hardened body of insulating cement 2–14 within which end portions of the adjacent metallic suspension filaments 24–1, 24–2 are insulatingly embedded so as to be insulated from each other and from the metal sleeve 2–13 and provide a strong junction with the anchor elements 2–11, 2–12, respectively. The inner anchor elements 2–11 of each of the two suspension members 23, 24 are under tension so that they will carry the coil 20 in its operative position in the air gaps of the magnetic structure for producing a coil deflection which indicates the magnitude of the current through the coil 20. The outer anchor ends 2–12 of the two bifilary suspension members 23, 24 are connected to suitably supported tensioning spring structures 2–20 which maintain the bifilary suspension members 23, 24 under the proper axial tension. Each tensioning spring structure 2–20 (Figs. 1, 2) is formed of two similar spiral metallic cantilever springs 2–21. Each of the two cantilever springs 2–21 is formed of a circular disc of metallic spring sheet material having cut therein a spiral groove 2–24 to form out of it a long spirally shaped spring having a circular outer mounting portion or ring 2–25 and a circular inner mounting portion or ring 2–26. In the form shown, the two cantilever springs 2–21 of each spring unit 2–20 are alike, except that they are assembled so that they spiral in opposite directions with their outer spring mounting rings 2–25 affixed to opposite sides of an outer junction ring 2–22 and their inner spring mounting rings 2–26 are similarly affixed to an inner junction ring 2–23 (Fig. 1).

The outer anchoring element 2–12 of each bifilary suspension member is of somewhat greater width than the inner anchor element 2–11 and the inner junction member 2–23 of each spring structure 2–20 has a central seat opening for holding therein the outer anchor element 2–12. The inner anchor element 2–11 of each bifilary suspension member is of smaller width than the outer anchor element 2–12, so that it may be threaded together with the bifilary suspension member through the seat opening of the spring structure 2–20. After so threading the respective bifilary suspension member, through the seat opening of the inner spring junction member 2–23 of the respective spring structure 2–20, the inner anchor element 2–11 is affixed in a junction socket seat of the respective opposite saddle members 2–16 of the coil 20 for holding it in its operative position.

Each of the opposite spring tension structures 2–20 is carried in its proper axially aligned position by opposite suspension heads 2–31 held seated along interengaging conical surfaces within two adjusting collars 2–35 mounted within opposite ends of a mounting sleeve 2–41 of the coil tensioning structure, all of these elements being of metal and relatively rigid. The adjusting collars 2–35 engage with their outer threaded cylindrical surfaces correspondingly threaded inner seating surfaces of the aligning sleeve 2–41 so that by turning an adjusting collar 2–35 it may be moved in axial direction of the coil suspension members 23, 24 for adjusting the tension which the two spring structures 2–20 apply to the two axially aligned bifilary suspension members 23, 24 for maintaining the coil in its proper operative floating condition within the air gap field of the magnetic structure 10.

The meter coil 20 is provided with a plurality of coil sections and coil taps which are connected to the inner ends of the four suspension filaments of two bifilary suspension members 23, 24 (Fig. 1) as by wire leads which are soldered to the coil ends and coil taps and to the filament end portions protruding beyond the inner anchor elements 2–11 of the respective bifilary suspension members. The outer ends of the two filaments of each bifilary suspension member 23, 24 protruding beyond their outer anchor elements 2–12 are connected to pairs of insulated metallic terminal lugs 2–38 which are suitably affixed, as by screws, to insulating plugs 2–39 held affixed within the hollow region of the two opposite suspension heads 2–31 of the suspension structure.

The common mounting sleeve 2–41 which holds all elements of the coil suspension structure in their properly aligned operative positions, has also affixed thereto the intermediate magnetic core element 14 so that it forms with these elements a unitary suspension structure which may be removed and mounted readily as a unit in its proper aligned position relatively to the magnetic structure 10 of the meter movement.

In the form shown in Fig. 1, the two pole pieces of the core 10 are joined to each other in their properly spaced positions with respect to the intermediate core portion 14 by two cylindrical metallic collars 2–61, 2–62 having mounting flanges with which they are affixed to the two pole pieces of the core 10, as by screws 2–68, 2–69 (Fig. 4), and also dowel pins (not seen). The two mounting collars 2–61, 2–62 form with the pole pieces of the core 10 a self-supporting pole unit which is suitably affixed, as by screws (not seen) to the permanent magnet structure 10–1, with which they form a self-supporting magnet core assembly 10. The interior cylindrical surfaces of the two mounting collars 2–61, 2–62 of this core assembly are aligned with the cylindrical end surfaces of the two pole pieces of the core 10 which are spaced from the facing cylindrical surfaces of the intermediate core portion 14 by arcuate air gaps 11 in which the two operative coil sides 21 of the meter coil 20 move. The common mounting sleeve 2–41 of the bifilary coil suspension assembly unit including the intermediate core element 14 is arranged for insertion as a unit within the cylindrical space of the aligned mounting collars 2–61, 2–62 of the magnet core assembly.

The meter coil 20 is provided with a pointer 2–45 for indicating on a scale 16 (Fig. 4) the measured current corresponding to the deflection of the coil 20. The scale, which may have an arcuate shape, is formed on scale plate 2–49 suitably affixed to the fixed magnetic structure 10–1. The pointer 2–45 is of metal and is provided with a pointer balance 2–46 so that they balance each other with respect to the central axis of the coil and the bifilary suspension members aligned therewith. In most cases, the pointer balance 2-46 is made with a lesser mass than required for balancing the pointer mass, additional adjusting weights being affixed to the pointer balance 2-46 so as to permit ready adjustment of the proper balance of the pointer as each meter movement is assembled.

In practice care is taken to assure that all metallic elements of the meter movement of the type described above are formed of non-magnetic metal except for the permanent magnet structure 10-1 with its pole pieces and the intermediate core element 14. The pointer 2-45 and its balance extension 2-46 are usually made of a light metal such as aluminum, and the balancing weights which are applied to the pointer balance 2-46 are either aluminum or copper or similar non-magnetic metal.

In practical meter movements of the type just described the metal filaments 24-1, 24-2 of the bifilary suspension members 23, 24 have to have an extremely small cross-section, such as 0.001 inch cross-section diameter, and they have to be subjected to relatively large tensioning forces. Accordingly, it is essential that the filaments of such bifilary suspension members remain unaffected by corrosive action of the surroundings and that they should not deteriorate during the prolonged periods of use. In the past, the only metal that has been found possible for use as suspension filaments of such bifilary meter suspension movements was a platinum alloy consisting of platinum alloy containing small alloying additions of some of the other elements of a platinum metal group, such as palladium, ruthenium, osmium and iridium. However, drawn minutely-thin filaments of platinum of such platinum alloy have an extremely smooth surface. Accordingly, critical difficulties are encountered in providing a strong insulating junction between the end portions of such platinum filaments by any of the known insulating cements when forming the anchoring junctions by which the bifilary suspension members are joined into the coil suspension structure.

I have discovered that the critical difficulties encountered with anchoring junctions for bifilary suspension members of direct current meters of the foregoing type are overcome by forming the bifilary suspension member of such meters out of minutely thin filaments of drawn ductile tungsten which have been electroplated with a thin coating of platinum. I have discovered that minutely thin drawn tungsten filaments which have been plated with a thin coating of platinum have an extremely rough exterior surface consisting of irregular peaks and valleys of much higher order of magnitude than any surface irregularities found in any other metal filament of substantial tensile strength that could possibly be used for forming bifilary meter suspension members of the foregoing type. Because of the higher order of magnitude the rough surface irregularities present on the minutely thin tungsten filament having a thin electro-plating of platinum they form with available insulating cements highly effective anchoring junctions which have a junction strength of a much higher order of magnitude than possible to provide with any other metal filaments suitable for use in bifilary meter suspension members. Such bifilary suspension members of the invention formed of platinum-plated minutely thin tungsten filaments have not only such unusually great junction strength at their anchoring junctions but they are also able to withstand much higher tension forces for the same cross-sectional than bifilary suspension members formed with platinum filaments.

Without thereby limiting the scope of the invention but only in order to enable more ready practice of the invention there will be now given data of a practical bifilary suspension structure of the invention:

Length of each suspension bifilary member 1.125 inch
Filament of drawn tungsten coated with platinum having a thickness of 0.00085 inch
Thickness of platinum coating corresponding to about 1% by weight of the tungsten filament In general, tungsten filaments of a thickness of about 0.002 inch or less having a platinum coating the weight of which is about ½ to 2% and even up to 5% of the tungsten have been found satisfactory for high sensitivity meter movements of the type described above.

According to a further phase of the invention, current meters, of the type disclosed in U.S. Patent 2,562,183, wherein the movable coil is held deflectively suspended by bifilary suspension members, are given a much higher sensitivity by forming the bifilary suspension members out of two flat metal filaments instead of filaments of circular or rectangular cross-section. As an example, bifilary suspension members formed of flat metal filaments having a thickness of about ¼ of the width of the filament, when used for the bifilary coil suspension member of such direct-current meter, will provide a meter sensitivity twice as great as the same meter operating with similar bifilary suspension members formed of filaments of the same metal and the cross-sectional area but having a circular cross-section.

Fig. 3 shows greatly enlarged a cross-sectional view of the bifilary suspension member 24 of Fig. 1 as seen in the downward direction, being similar to the other suspension member 23. From the outer anchor element 2-12 with its metal sleeve 2-13 extend upwardly the two parallel suspension filaments 24-1, 24-2. The interior of the cylindrical metal sleeve 2-13 of anchor element 2-12 is filled with a strong insulating cement 2-14 in which are embedded end portions of the two metal filaments 24-1, 24-2 which are joined by the cement to the metal sleeve 2-13 into a strong anchoring junction. Each of the filaments 24-1, 24-2, of the bifilary suspension members—whether of circular cross-section or of flat ribbon cross-section—are formed of drawn ductile tungsten having the desired small cross-section, the tungsten filament being electro-plated with a thin coating of platinum. Fig. 3 shows, exaggerated, that each filament 24-1, 24-2 has an interior core 2-53 of tungsten and an exterior electro-deposited platinum coating 2-54 of minute thickness.

According to a phase of the invention, the two filaments of each bifilary suspension member are made in the form of flat ribbons, thereby reducing their torsional rigidity against deflection to only a fraction of that exhibited by filaments of the same cross-sectional area but having a circular or square cross-section. Accordingly, bifilary meter coil suspension movement of the invention in which bifilary coil suspension members are formed out of adjacent flat ribbon filaments of minute cross-sectional area will operate with about two or even more times the sensitivity of a similar instrument having bifilary suspension members formed with filaments of circular cross-section having the same cross-sectional area.

The meter movement shown in Figs. 1 and 4 is also provided with a magnetic shield structure 2-47 consisting of two superposed sheet members 2-81, 2-83 of magnetic shield material separated by a shield space 2-84 for suppressing penetration of disturbing magnetic leakage from the pole pieces into the region of the pointer 2-45 and its balance 2-46.

The features and principles underlying the invention described above in connection with specific exemplifications, will suggest to those skilled in the art many other modifications thereof. It is accordingly desired that the appended claims be construed broadly and that they shall not be limited to the specific details shown and described in connection with exemplifications thereof.

I claim:

1. In a current measuring device having a field structure held adjacent a predetermined limited field zone for inducing a magnetic field in said field zone: a coil held in the region of said limited field zone having two opposite coil sides extending through said field zone for producing a coil deflection around an axis of said coil indicating the magnitude of electric current passing therethrough; a suspension structure for controlling the deflection of said coil including two spaced supports, two elongated bifilary suspension members coaxial with the coil axis, and connected with their inner ends to the other opposite transverse coil sides of said coil and with their outer ends to said two supports and constituting the sole rotatable support carrying said coil in a floating operative position, and tensioning means exerting axial tension on said bifilary members and said coil for restraining rotation of said coil from a preset position and maintaining it under axial tension and out of engagement with said core structure, each of said bifilary suspension members having at its opposite ends anchor elements through which it is tensioned and through which it is joined to its coil side and its support, respectively, and having two substantially parallel suspension filaments of minute cross-section held by said anchor elements at a predetermined close filament spacing, each filament consisting essentially of a drawn, ductile tungsten core having an exterior electrodeposited coating of corrosion-resistant metal adhering to said core, each anchor element including an insulating body of solidified cementitious material in which junction portions of the two filaments are insulatingly embedded and fixing the close spacing of the two filaments and the respective anchor element, the exterior surface of each coated filament having pronounced surface irregularities consisting of hills and valleys, whereby its junction portions are interlockingly fixed in the insulating body of said anchor elements.

2. In a current measuring device as claimed in claim 1, the metal of said coating being ½% to 5% by weight of the tungsten of said core.

3. In a current measuring device as claimed in claim 2, each filament being of oblong substantially flat cross-section with a width at least three times greater than its thickness, the wider surfaces of the two filaments of each bifilary member facing and extending parallel to each other.

4. In a current measuring device as claimed in claim 1, the electrodeposited coating of the core of each filament consisting essentially of platinum.

5. In a current measuring device as claimed in claim 4, the metal of said coating being ½% to 5% by weight of the tungsten of said core.

6. In a current measuring device as claimed in claim 5, each filament being of oblong substantially flat cross-section with a width at least three times greater than its thickness, the wider surfaces of the two filaments of each bifilary member facing and extending parallel to each other.

References Cited in the file of this patent

UNITED STATES PATENTS

| | | |
|---|---|---|
| 1,228,194 | Fahrenwald | May 29, 1917 |
| 1,951,578 | Peters | Mar. 20, 1934 |
| 2,535,065 | Heiland | Dec. 26, 1950 |
| 2,562,183 | Greibach | July 31, 1951 |